US007739807B2

(12) United States Patent
Grant

(10) Patent No.: US 7,739,807 B2
(45) Date of Patent: Jun. 22, 2010

(54) SIDING GAUGE DEVICE FOR STAPLE GUN

(76) Inventor: Kevin Anthony Grant, 390 Kensington Street, Winnipeg, Mb (CA) R3J 1J5

(*) Notice: Subject to any disclaimer, the term of this patent is extended or adjusted under 35 U.S.C. 154(b) by 105 days.

(21) Appl. No.: 12/118,246

(22) Filed: May 9, 2008

(65) Prior Publication Data

US 2009/0277032 A1 Nov. 12, 2009

(51) Int. Cl.
*B25C 7/00* (2006.01)
*B23Q 17/22* (2006.01)
*G01B 21/00* (2006.01)

(52) U.S. Cl. ............................ 33/645; 33/626; 33/648; 227/107

(58) Field of Classification Search .................... 33/645
See application file for complete search history.

(56) References Cited

U.S. PATENT DOCUMENTS 4,380,312 A * 4/1983 Landrus ...................... 227/116
4,731,917 A 3/1988 Krowl
4,821,937 A 4/1989 Rafferty
5,052,607 A * 10/1991 Dutton ....................... 227/107
5,094,380 A 3/1992 Nasiatka
5,097,604 A * 3/1992 Brown ......................... 33/613
5,267,682 A * 12/1993 Okouchi ..................... 227/151
5,628,445 A * 5/1997 Braddock et al. ........... 227/151
6,393,711 B1 5/2002 Freund
6,769,193 B1 8/2004 Meisner
6,824,036 B2 * 11/2004 Walter ........................ 227/120
7,575,140 B2 * 8/2009 Jiang .......................... 227/110
2002/0092370 A1 * 7/2002 Pawelek et al. ............ 73/866.5

* cited by examiner

*Primary Examiner*—Christopher W Fulton
(74) *Attorney, Agent, or Firm*—Ade & Company Inc.; Ryan W. Dupuis; Kyle R. Satterthwaste

(57) ABSTRACT

A gauge device for use with a staple gun serves to align the staple gun relative to building siding to dispense a two prong staple from a head of the staple gun into one of a plurality of fastener apertures in siding members of the building siding. The gauge device comprises a pair of flanges arranged to depend from laterally opposed sides of the head of the staple gun at a location such that abutment of one of the flanges below a lock edge channel of a siding member locates one prong of the two prong staple to be in alignment with one of the fastener apertures and locates the other prong of the two prong staple above the top free edge of a nailing flange of the siding member.

20 Claims, 4 Drawing Sheets

SIDING GAUGE DEVICE FOR STAPLE GUN

This application claims foreign priority benefits from Canadian Patent Application 2,588,719, filed May 10, 2007.

FIELD OF THE INVENTION

The present invention relates to a gauge for aligning a staple gun with siding, and more particularly relates to a gauge which is suited for use with interlocking siding, for example vinyl siding and the like.

BACKGROUND

Interlocking siding, for example vinyl siding and the like, is a common exterior finish for various buildings. Vinyl siding typically comprises a profile representing two or three overlapping siding boards in appearance as a single integral panel. A hook is formed along a bottom edge of the panel opposite a nailing flange extending along the top edge of the panel. A plurality of apertures are provided in the nailing flange at spaced positions along the top edge. A channel or lock edge is formed along the top edge of the panel also, just below the nailing flange. The channel is arranged to matingly receive the hook at the bottom edge of a subsequently installed panel of similar configuration. Fasteners are mounted within the apertures in the nailing flanges of each subsequent row as the siding is mounted on the building.

For ease and speed of installation, it is common to use powered guns to insert the fasteners, for example nail guns or staple guns. U.S. Pat. Nos. 4,821,937 and 6,393,711 describe examples of nailing guns including guides which are particularly suited for siding. When installing vinyl siding however use of staples is typically preferred to better control the depth of penetration of the fasteners.

U.S. Pat. No. 5,094,380 to Nasiatka and U.S. Pat. No. 6,769,193 to Meisner disclose attachments for staple guns in which a pair of laterally spaced projections are provided on the dispensing head of the staple gun for aligning the staples with the apertures in the nailing flange of the siding. In order to properly align the tool however one of the projections must be aligned with and received within one of the apertures in the nailing flange, representing a time consuming and awkward task for a user to do repetitively when installing vinyl siding.

U.S. Pat. No. 4,731,917 to Krowl discloses an attachment for a staple gun for use with vinyl siding in which an elongate channel is provided in fixed relation to the body of the gun for sliding along a top edge of the channel in the siding receiving the hook of a subsequent panel. In this instance the moveable safety tip on the staple gun which normally requires being depressed against a surface to receive the dispensed staple therein is disengaged from use. Accordingly there is a considerable risk of injury when using the staple gun by the teachings of Krowl. Furthermore the channel is taught to be slid along the top edge of the channel in the siding so that the siding panel is accordingly urged downwardly into disengagement with the previous installed panel rather than encouraging a more snug engagement between the panels as they are subsequently installed.

SUMMARY OF THE INVENTION

According to one aspect of the invention there is provided a siding gauge device arranged for use with a staple gun to dispense a two prong staple from a head of the staple gun into one of a plurality of fastener apertures in a siding member comprising a panel having a hook portion along a bottom edge, a nailing flange forming a top free edge of the panel and locating the fastener apertures therein, and a lock edge channel extending along the top free edge of the panel below the nailing flange for receiving the hook portion of a subsequent siding member of similar configuration therein, the device comprising:

an attachment member arranged to be secured to the head of the staple gun;

a pair of depending flanges supported spaced apart from one another on laterally opposed sides of the attachment member such that the flanges are arranged to depend from laterally opposed sides of the head of the staple gun;

each depending flange being arranged to be positioned relative to the head of the staple gun such that abutment of the flange below the lock edge channel of the siding member locates one prong of the two prong staple to be in alignment with one of the fastener apertures and locates the other prong of the two prong staple above the top free edge of the nailing flange.

By providing flanges which are able to be slid along the channel of the siding and which are moveable with the safety tip of the staple gun, the present invention both increases safety and decreases the time for aligning each fastener as nothing requires insertion within the apertures in the nailing flange. Furthermore by providing suitably spaced depending flanges which permit engagement along the bottom edge of the channel rather than the top edge for aligning each staple to be dispensed within a respective fastener aperture, the force applied to the staple gun to simply maintain contact of the depending flange with the bottom edge of the channel on the siding thus acts to encourage an upward force on the siding to maintain the siding under tension and further encourage better securement between adjacent rows of siding panels.

The depending flanges are preferably arranged to be supported for relative sliding movement in a lateral direction relative to one another such that a spacing between the depending flanges is arranged to be adjustable.

When there is provided a pair of grooves formed in one of the attachment member and the depending flanges and a pair of ribs formed in the other one of the attachment member and the depending flanges, the grooves are preferably arranged for matingly receiving the ribs therein for relative sliding movement in the lateral direction. The grooves and the ribs may have sloped side walls arranged for mating engagement with one another such that the ribs are arranged to be wedged into the grooves when fastening the depending flanges to the attachment member.

The depending flanges are preferably oriented perpendicularly to the lateral direction.

The attachment member preferably comprises a channel arranged to receive a portion of the head of the staple gun therein.

The channel may comprise a base and a pair of sides extending from the base in a U-shaped cross section in which the channel is open between opposed top and bottom ends so as to be arranged to receive the portion of the head of the staple therethrough.

There may be provided a fastener aperture in the base of the channel arranged for receiving a fastener to secure the attachment member to the head of the staple gun.

A pair of flanges may be supported on the respective sides of the channel opposite the base and oriented to project inwardly towards one another for additional support relative to the head of the staple gun received therein.

There may be provided a pair of retainer flanges supported on the respective sides at the open bottom of the channel such that the head of the staple gun is arranged to abut the retainer flanges when inserted through the top end of the channel.

There may be provided a pair of mounting flanges extending lateral outward from the opposing sides of the attachment member which are arranged to support the depending flanges thereon for relative sliding movement in a lateral direction.

When used with a staple gun comprising a body, a head and a safety tip on the head which is movable relative to the body of the staple gun, the attachment member is preferably arranged to be supported on the safety tip of the staple gun for movement with the safety tip relative to the body of the staple gun.

When used with a first staple gun having a dispensing head having a first configuration and a second staple gun having a dispensing head which differs in configuration from the dispensing head of the first staple gun, and the attachment member is arranged to mate with the dispensing head of the first staple gun, preferably there is provided an adapter member having a first fastener aperture arranged for mating with a fastener aperture on the attachment member and a second fastener aperture arranged for alignment with a mounting hole on the head of the second staple gun.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
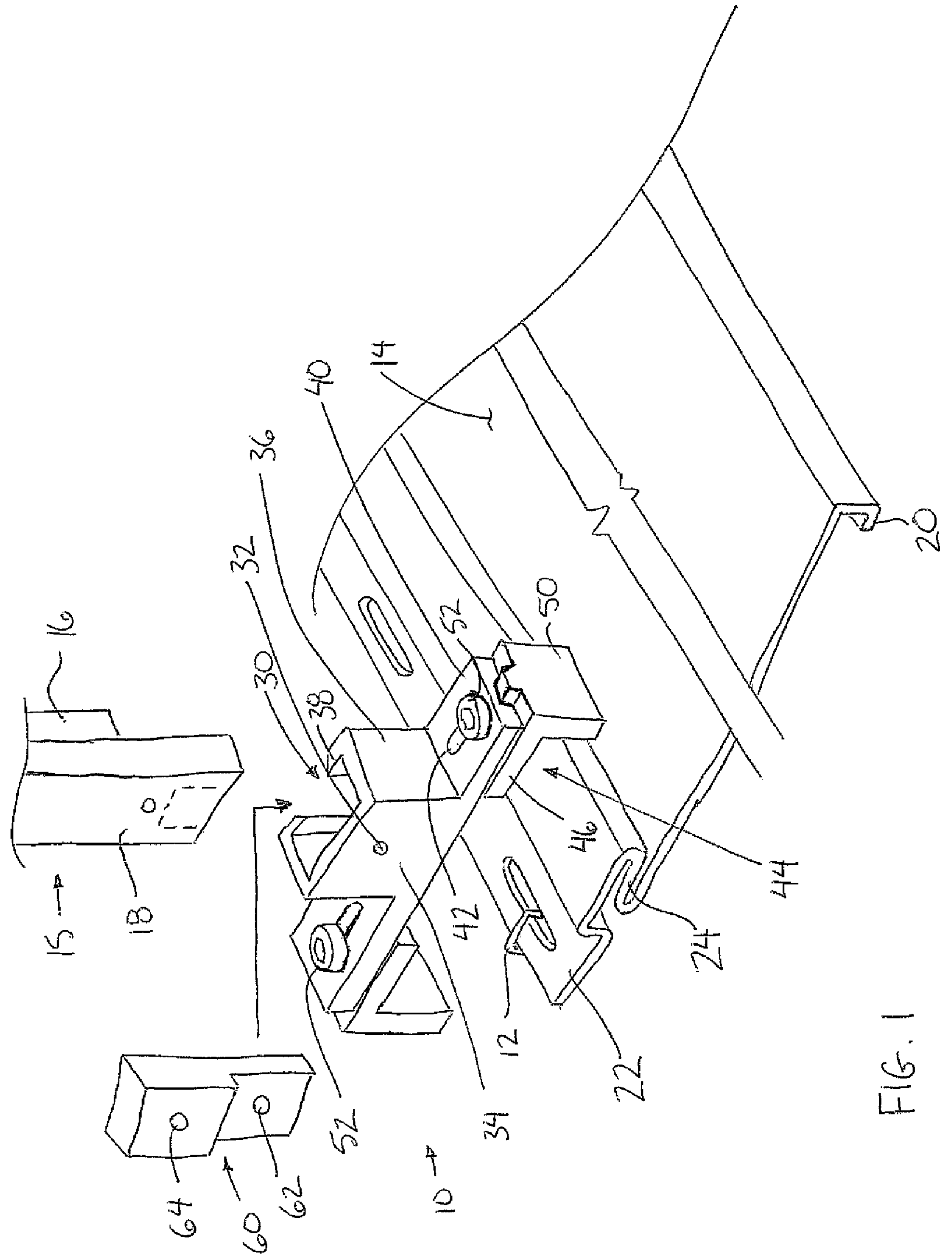
FIG. 1 is a perspective view of the siding gauge device shown separated from a staple gun but in alignment with a vinyl siding panel.
Figure 2:
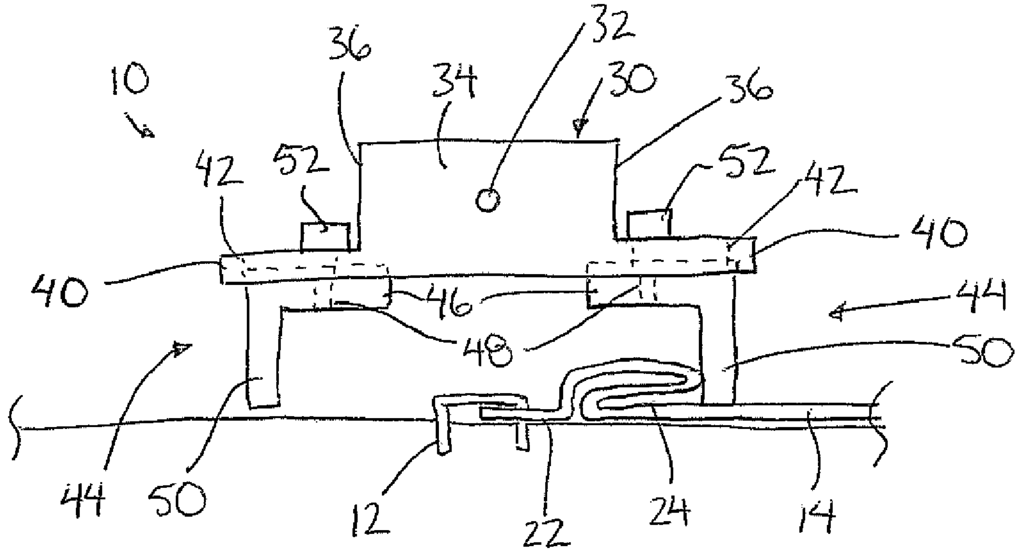
FIG. 2 is an end elevational view of the device with the depending flanges shown at a narrow spacing relative to one another.
Figure 3:
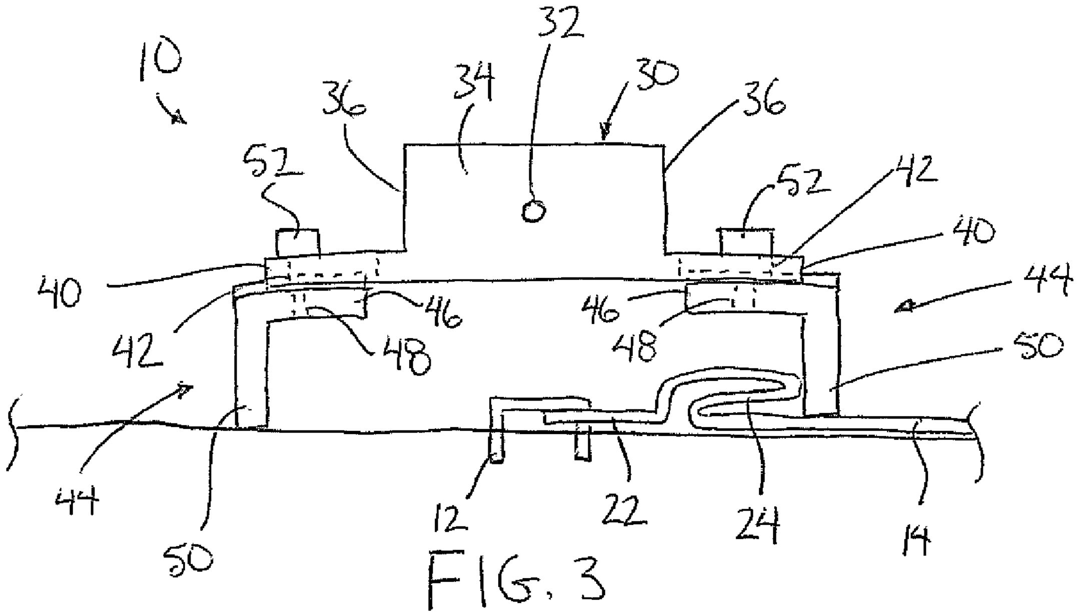
FIG. 3 is an end elevational view of the device with the depending flanges shown at a larger spacing therebetween in relation to the position of FIG. 2 for accommodating a vinyl siding panel having a larger dimension between the bottom edge of the lock edge channel of the siding and the upper free edge of the nailing flange of the siding.
Figure 4:
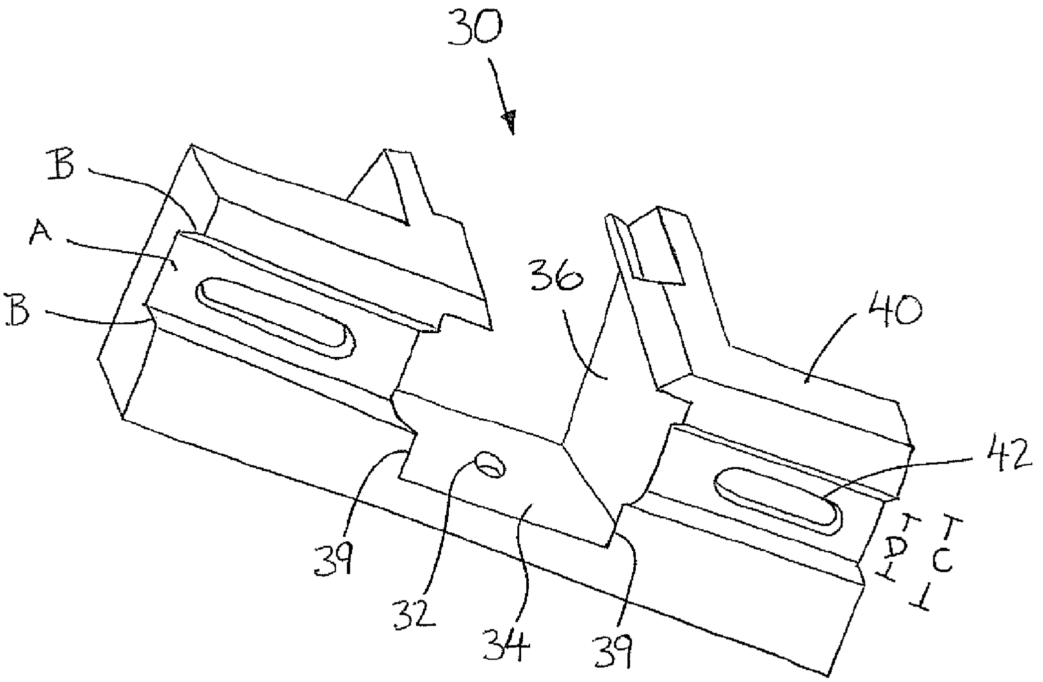
FIG. 4 is a perspective view of the siding gauge device with the depending flanges shown removed.
Figure 5:
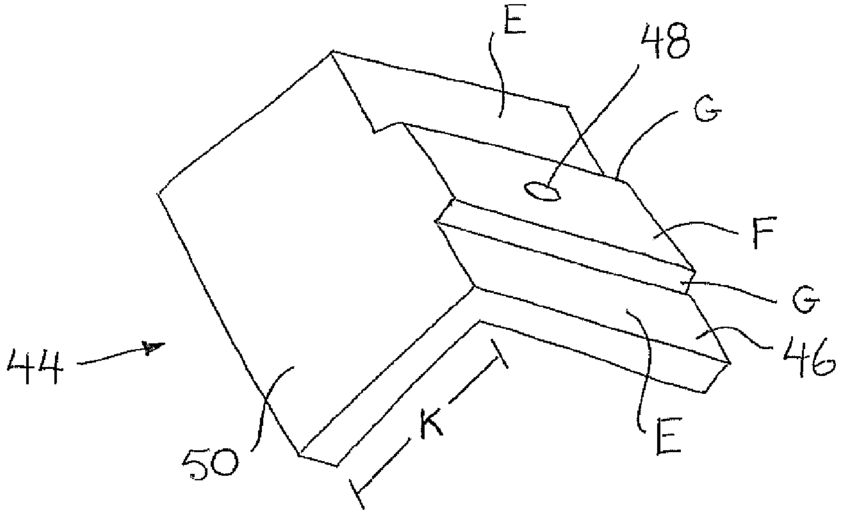
FIG. 5 is a perspective view of one of the depending flanges removed from the siding gauge device.

Referring to the accompanying figures there is illustrated a siding gauge device generally indicated by reference numeral 10. The device 10 is particularly suited for aligning staples 12 with interlocking siding panels 14, for example vinyl siding panels and the like.

The staples 12 are typically dispensed from a powered staple gun 15 including a dispensing head 16 for dispensing the staples therefrom upon actuation. The dispensing head 16 includes a safety tip 18 which is moveable in relation to the body of the staple gun. The safety tip 18 comprises a switch which is actuated only when the safety tip is contacted against a surface to receive a staple therein as the gun body is advanced towards the surface so that the safety tip is retracted towards the gun body. Once the safety tip is actuated, the trigger of the staple gun becomes activated and permits a staple to be dispensed. The device 10 is suitably arranged for attachment to the safety tip 18 of the dispensing head of the staple gun using threaded fasteners for subsequent selective separation of the device from the head 16 as desired. The device 10 attaches to the safety tip 18 for movement therewith relative to the gun body so as not to interfere with the safety function of the tip 18.

The device 10 is well suited for use of the staple gun for securing siding panels 14 to an upright supporting surface of the type which typically has the profile or contour of two overlapping siding boards, but formed as a single integral panel. A hook portion 20 is illustrated along the bottom edge of the panel to extend inwardly and upwardly in relation to the panel along the full length of the bottom edge thereof.

Typically the siding panels 14 include a nailing flange 22 extending upwardly along the top edge of the siding panel opposite the hook portion 20. A lock edge channel 24 also extends along the top edge of the panel immediate below the nailing flange 22 extending upwardly therefrom. The lock edge channel 24 defines a receptacle extending along the length of the panel of suitable configuration for matingly receiving the hook portion 20 of a subsequently installed panel therein.

The device 10 comprises an attachment member 30 having a fastener aperture 32 formed therein for receiving a fastener which cooperates with an existing fastener aperture formed in the safety tip 18 of the dispensing head of the staple gun. In this instance the device 10 can be readily attached to the existing safety tip of the staple gun and subsequently removed therefrom without interfering with the function of the gun. When attached to the safety tip 18, the device 10 is movable with the safety tip relative to the gun body for continued normal operation of the safety tip.

The attachment member 30 comprises an upright channel having a base 34 locating the fastener aperture 32 therein for securement across the front side of the safety tip 18 of the staple gun. The upright channel forming the attachment member further includes a pair of sides 36 extending rearwardly from opposing sides of the base 34 to form a generally U-shaped cross section with the base extending vertically between open top and bottom ends of the attachment member 30 receiving the safety tip 18 of the gun therethrough. Flanges 38 extend along the rear edges of the sides 36 of the upright channel which are oriented to project inwardly towards one another for overlapping a rear side of the safety tip 18.

The base 34, the sides 36 and the flanges 38 of the upright channel together define a substantially rectangular perimeter of the channel which is open along a central portion of the rear thereof through between the open top and bottom ends. The defined rectangular perimeter of the channel forming the attachment member is suitable dimensioned for receiving the safety tip 18 therein with close tolerance therebetween.

Retainer flanges 39 project inwardly from opposing sides 36 of the thru channel of the attachment member at the bottom opening against which the head 18 can abut when inserted through the open top end of the attachment member. The flanges may be formed by machining the thru channel with a round bit 41 which machines the sides 36 downwardly from the top opening, only partway through the bottom opening of the channel. The resulting radius of curvature formed by the round bit 41 leaves the flanges 39 projecting inwardly towards one another. The flanges 39 are short enough that they do not interfere with the stapling action of the head 18. The flanges 39 accordingly act as a stop to prevent the safety tip or head 18 from being inserted through from the top of the channel, any further than the bottom of the channel. The flanges 39 take all of the pressure applied to depress the safety mechanism allowing the stapler to fire. The fastener aperture 32 is used to stop the device 10 from falling off of the safety tip 18 of the attachment of an adapter member 60 to the base 34 as noted further below.

A pair of mounting flanges 40 are formed integrally with the channel forming the attachment member 30 to project laterally outwardly from opposing sides 36 of the upright channel. The flanges 40 lie in a generally common plane which is substantially perpendicular to a through axis of the channel between the open top and bottom ends thereof.

Each mounting flange 40 includes a respective fastener slot 42 therein which is open through between the top and bottom faces of the respective flange 40 and which is elongate in a lateral direction extending laterally outwardly from the upright channel of the attachment member away from the opposing mounting flange 40. The elongate slots are thus aligned with one another.

Each mounting flange 40 includes a groove A formed in the underside thereof opposite the channel 30 in which the groove extends laterally a full length of each of the mounting flanges in respective longitudinal alignment with one another. The grooves A are arranged to be centered for centrally locating the respective slots 42 in alignment therewith and extending substantially along the length thereof in the lateral direction.

The mounting flanges 40 serve to support a pair of guides 44 thereon which are suitably arranged for engaging the siding panel 14 to align staples 12 with the fastener apertures in the nailing flange. Each guide 44 includes a fastener flange 46 which is supported against the bottom side of the respective mounting flanges 40 parallel thereto.

Each fastener flange 46 includes a rib F formed thereon which is raised in relation to cutaway recessed areas E along both sides of the rib. A fastener aperture 48 is located centrally within each rib F for alignment with the respective fastener slot when the rib of the guide 44 is inserted in mating connection into the respective groove A on the respective mounting flange 40 such that the ribs are aligned with the grooves for lateral sliding movement therein to laterally displace the guides 44 inwardly towards one another and outwardly away from one another. The mating ribs of the guides which are received in the grooves serve to maintain alignment of the fastener apertures in the ribs of the fastener flanges 46 with the slots 42 as the fastener flanges are displaced towards and away from one another for sliding movement in the lateral direction. The two grooves A formed in the opposing mounting flanges 40 are aligned with one another so that the guides 44 are mounted with the ribs thereof also aligned with one another for sliding movement along a common lateral sliding axis.

Each guide 44 also includes a depending flange 50 which is mounted on the outer edge of the fastener flange 46 to depend downwardly therefrom and extend parallel to one another and to the longitudinal axis of the upright channel forming the attachment member 30. The depending flanges 50 of the two guides 44 are also oriented to be generally perpendicular to the laterally extending grooves and mating ribs and accordingly are perpendicular to the lateral sliding movement of the guides relative to the attachment member 30. The depending flanges 50 are also vertically arranged to be perpendicular to a horizontal plane of the fastener flanges and of the mounting flanges 40.

Suitable threaded fasteners 52, for example an Allen or Hex key, or Torx key bolt are received through each aligned pair of fastener aperture 48 and fastener slot 42 for selectively fixing the position of the guides relative to the attachment member 30 when the fasteners 52 are tightened. The fasteners 52 are arranged to include a threaded portion which engages threadably into the respective fastener aperture 48 of the guides which is internally threaded for mating connection with the fastener 52. The threaded shafts of the fasteners 52 are arranged to be slidably received along the length of the slots 42 while a head of the fasteners 52 engages the top side of the respective mounting flange 40 for clamping the mounting flange between the head of the fastener and the respective guide 44 to which it is respectively secured. In a set position of the guides 44 relative to the attachment member, the depending flanges 50 of the guides are laterally spaced apart from one another on opposing sides of the attachment member so that the upright channel of the attachment member is centered between the two depending flanges.

Each of the grooves A include side walls B extending in the longitudinal direction of the groove which are tapered to slope outwardly with increasing width relative to one another from the internal base of the groove to the mouth of the groove so that the mouth C of the groove is wider than the base D of the groove. The ribs F which mate with the grooves A respectively similarly include sloped side walls G having an inclination which matches the inclination of the side walls B of the grooves A for mating connection therewith. The ribs thus include side walls which taper inwardly from a widest dimension therebetween at the base of the rib to a narrowest portion at the free end of the rib which is raised the most in relation to the recessed area E of the fastener flanges 46.

Figure 6:
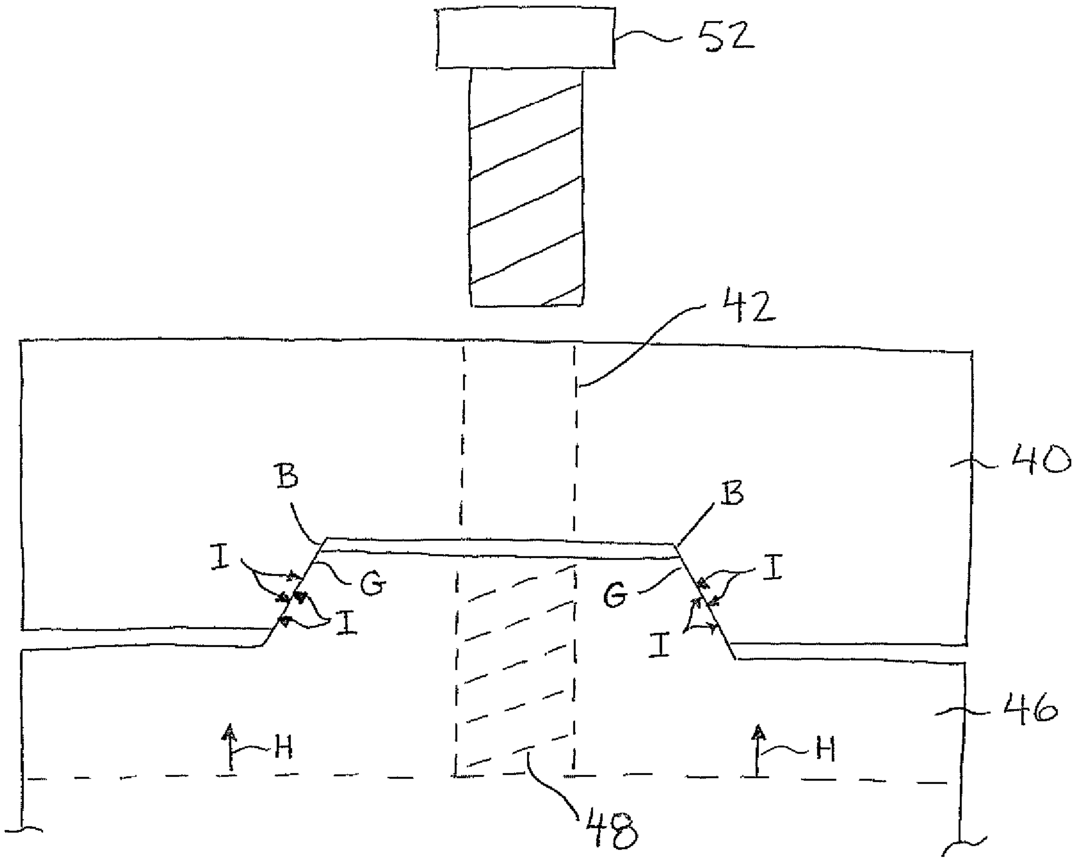
FIG. 6 is an end view of mating connection of one of the depending flanges on the attachment member.
Figure 7:
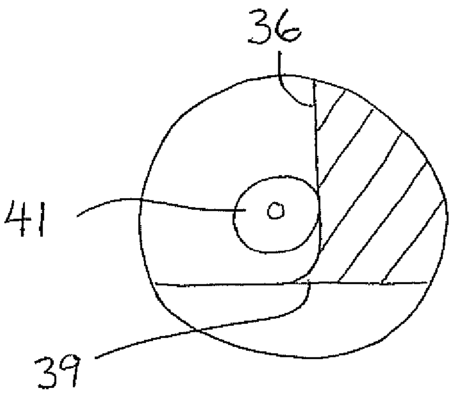
FIG. 7 is a schematic illustration of the formation of a retainer flange of the attachment member.

The ribs F are arranged to be slightly wider between the side walls G thereof than the grooves A between their respective side walls B so that the ribs cannot be fully penetrated into the grooves to bottom out with the fastener flanges 46 abutted against the mounting flanges 40, but rather a majority of the ribs are received into the respective recesses or grooves A while maintaining a very slight space between the mounting flanges 40 and the fastener flanges 46. Accordingly as the fasteners 52 are tightened, the ribs are wedged further into the respective grooves as the fastener flange 46 is brought closer to the mounting flanges 40 in the direction H shown in FIG. 6. Accordingly, considerable friction can be produced between the side walls B and side walls G of the grooves and ribs respectively so that the contacting surfaces I prevent relative sliding of the ribs within the grooves when the fasteners 52 are tightened.

The depending flanges 50 have a set length K as measured from the fastener flanges 46 to the free ends thereof arranged so that they have a staple height above the nailing flange 22 to allow movement of the siding panel 14. All fine adjustments are done by the safety tip 18 adjustments, or the staples countersink depth adjustment already provided for in standard use.

The mounting flanges 40 project laterally outwardly of sufficient lateral width overall so that the guides 44 may be mounted thereon for sliding movement in the lateral direction by sliding the ribs within the mating grooves so that the fasteners 52 threaded within the fastener apertures 48 also slide along the respective fastener slots 42. The guides 44 are arranged to be positioned with a suitable lateral spacing therebetween that when one of the flanges is abutted against the bottom edge of the lock edge channel 24 of the siding panel, the upper free edge of the nailing flange of the siding panel is resultingly centered laterally with respect to the tip of the dispensing head on the staple gun. Accordingly when a two prong staple is dispensed from the dispensing head of the gun, one of the prongs is suitably positioned for insertion into one of the fastener apertures in the nailing flange while the other prong is located above the top free edge of the nailing flange so that the staple overlaps the top free edge of the nailing flange of the panel.

In use when installing several staples along the top edge of a given panel to be installed, one of the depending flanges is abutted against the bottom edge of the lock edge channel of the panel and is urged upwardly thereagainst to maintain the siding panel slightly under tension to positively engage the hook portion of the panel within the receptacle defined by the locking edge channel of a previously installed panel. Displacing the depending flange by sliding movement along the bottom edge of the lock edge channel will consecutively align the dispending head of the staple gun with a plurality of apertures along the nailing flange.

The dimensions of the upright channel forming the attachment member 30 are particularly suited for mating with the dispensing head of one particular brand of staple gun. For mating with other brands, the identically configured device 10 may be used with the addition of an adapter member 60 in the form of a small plate having a first fastener aperture 62 adjacent a bottom end for alignment with the fastener aperture 32 in the attachment member 30 and a second aperture 64 adjacent the top end which is arranged for alignment with a pre-existing mounting hole on the safety tip of a dispensing head of a different brand of staple gun.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A siding gauge device arranged for use with a staple gun comprising a body, a head and a safety tip on the head which is movable relative to the body of the staple gun so as to be arranged to dispense a two prong staple from a head of the staple gun into one of a plurality of fastener apertures in a siding member comprising a panel having a hook portion along a bottom edge, a nailing flange forming a top free edge of the panel and locating the fastener apertures therein, and a lock edge channel extending along the top free edge of the panel below the nailing flange for receiving the hook portion of a subsequent siding member of similar configuration therein, the device comprising:

an attachment member arranged to be secured to the safety tip on the head of the staple gun;

a pair of depending flanges supported spaced apart from one another on laterally opposed sides of the attachment member such that the flanges are arranged to depend from laterally opposed sides of the head of the staple gun;

each depending flange being arranged to be positioned relative to the head of the staple gun such that abutment of the flange below the lock edge channel of the siding member locates one prong of the two prong staple to be in alignment with one of the fastener apertures and locates the other prong of the two prong staple above the top free edge of the nailing flange;

the depending flanges being mounted on the attachment member so as to be arranged for movement together with the safety tip relative to the body of the staple gun.

2. The device according to claim 1 wherein the depending flanges are arranged to be supported for relative sliding movement in a lateral direction relative to one another such that a spacing between the depending flanges is arranged to be adjustable.

3. The device according to claim 2 wherein there is provided a pair of grooves formed in one of the attachment member and the depending flanges and a pair of ribs formed in the other one of the attachment member and the depending flanges, the grooves being arranged for matingly receiving the ribs therein for relative sliding movement in the lateral direction.

4. The device according to claim 3 wherein the grooves and the ribs have sloped side walls arranged for mating engagement with one another such that the ribs are arranged to be wedged into the grooves when fastening the depending flanges to the attachment member.

5. The device according to claim 2 wherein the depending flanges are oriented perpendicularly to the lateral direction.

6. The device according to claim 1 wherein there is provided a fastener aperture in the attachment member arranged for receiving a fastener to secure the attachment member to the head of the staple gun.

7. The device according to claim 1 wherein the attachment member comprises a channel arranged to receive a portion of the head of the staple gun therein.

8. The device according to claim 7 wherein the channel comprises a base and a pair of sides extending from the base in a U-shaped cross section, the channel being open between opposed top and bottom ends so as to be arranged to receive the portion of the head of the staple therethrough.

9. The device according to claim 8 wherein there is provided a fastener aperture in the base of the channel arranged for receiving a fastener to secure the attachment member to the head of the staple gun.

10. The device according to claim 8 wherein there is provided a pair of flanges supported on the respective sides of the channel opposite the base and oriented to project inwardly towards one another.

11. The device according to claim 8 wherein there is provided a pair of retainer flanges supported on the respective sides at the open bottom of the channel, the head of the staple gun being arranged to abut the retainer flanges when inserted through the top end of the channel.

12. The device according to claim 1 wherein there is provided a pair of mounting flanges extending lateral outward from the opposing sides of the attachment member, the mounting flanges being arranged to support the depending flanges thereon.

13. The device according to claim 12 wherein the depending flanges are supported on the mounting flanges for relative sliding movement in a lateral direction.

14. The device according to claim 1 in combination with a first staple gun having a dispensing head and a second staple gun having a dispensing head which differs in configuration from the dispensing head of the first staple gun, wherein the attachment member is arranged to mate with the dispensing head of the first staple gun and wherein there is provided an adapter member having a first fastener aperture arranged for mating with a fastener aperture on the attachment member and a second fastener aperture arranged for alignment with a mounting hole on the head of the second staple gun.

15. A siding gauge device arranged for use with a staple gun to dispense a two prong staple from a head of the staple gun into one of a plurality of fastener apertures in a siding member comprising a panel having a hook portion along a bottom edge, a nailing flange forming a top free edge of the panel and locating the fastener apertures therein, and a lock edge channel extending along the top free edge of the panel below the nailing flange for receiving the hook portion of a subsequent siding member of similar configuration therein, the device comprising:

an attachment member arranged to be secured to the head of the staple gun;

a pair of depending flanges supported spaced apart from one another on laterally opposed sides of the attachment member such that the flanges are arranged to depend from laterally opposed sides of the head of the staple gun;

each depending flange being arranged to be positioned relative to the head of the staple gun such that abutment of the flange below the lock edge channel of the siding member locates one prong of the two prong staple to be in alignment with one of the fastener apertures and locates the other prong of the two prong staple above the top free edge of the nailing flange;

wherein the depending flanges are arranged to be supported for relative sliding movement in a lateral direction relative to one another such that a spacing between the depending flanges is arranged to be adjustable; and wherein there is provided a pair of grooves formed in one of the attachment member and the depending flanges and a pair of ribs formed in the other one of the attachment member and the depending flanges such that the grooves are arranged for matingly receiving the ribs therein for relative sliding movement in the lateral direction.

16. The device according to claim 15 wherein the grooves and the ribs have sloped side walls arranged for mating engagement with one another such that the ribs are arranged to be wedged into the grooves when fastening the depending flanges to the attachment member.

17. A siding gauge device arranged for use with a staple gun to dispense a two prong staple from a head of the staple gun into one of a plurality of fastener apertures in a siding member comprising a panel having a hook portion along a bottom edge, a nailing flange forming a top free edge of the panel and locating the fastener apertures therein, and a lock edge channel extending along the top free edge of the panel below the nailing flange for receiving the hook portion of a subsequent siding member of similar configuration therein, the device comprising:

an attachment member comprises a channel arranged to receive a portion of the head of the staple gun therein so as to be arranged to be secured to the head of the staple gun;

a pair of depending flanges supported spaced apart from one another on laterally opposed sides of the attachment member such that the flanges are arranged to depend from laterally opposed sides of the head of the staple gun;

each depending flange being arranged to be positioned relative to the head of the staple gun such that abutment of the flange below the lock edge channel of the siding member locates one prong of the two prong staple to be in alignment with one of the fastener apertures and locates the other prong of the two prong staple above the top free edge of the nailing flange;

wherein the channel of the attachment member comprises a base and a pair of sides extending from the base in a U-shaped cross section, the channel being open between opposed top and bottom ends so as to be arranged to receive the portion of the head of the staple therethrough.

18. The device according to claim 17 wherein there is provided a fastener aperture in the base of the channel arranged for receiving a fastener to secure the attachment member to the head of the staple gun.

19. The device according to claim 17 wherein there is provided a pair of flanges supported on the respective sides of the channel opposite the base and oriented to project inwardly towards one another.

20. The device according to claim 17 wherein there is provided a pair of retainer flanges supported on the respective sides at the open bottom of the channel, the head of the staple gun being arranged to abut the retainer flanges when inserted through the top end of the channel.

* * * * *